United States Patent
Seo et al.

(10) Patent No.: US 12,271,736 B2
(45) Date of Patent: Apr. 8, 2025

(54) PROCESSOR-IN-MEMORY STORING A LOOKUP TABLE FOR PROVIDING AN INSTRUCTION IN RESPONSE TO AN API CALL INSTRUCTION

(71) Applicant: SAMSUNG ELECTRONICS CO., LTD., Suwon-si (KR)

(72) Inventors: Seungwoo Seo, Incheon (KR); Hyunsoo Kim, Bucheon-si (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 17/323,171

(22) Filed: May 18, 2021

(65) Prior Publication Data

US 2022/0156081 A1 May 19, 2022

(30) Foreign Application Priority Data

Nov. 18, 2020 (KR) ........................ 10-2020-0154790

(51) Int. Cl.
*G06F 9/30* (2018.01)
*G06F 9/38* (2018.01)
*G06F 15/78* (2006.01)

(52) U.S. Cl.
CPC ........ *G06F 9/30174* (2013.01); *G06F 9/3836* (2013.01); *G06F 15/7821* (2013.01)

(58) Field of Classification Search
CPC ........ G06F 3/0659; G06F 8/36; G06F 9/3017; G06F 9/30174; G06F 9/3836;
(Continued)

(56) References Cited

U.S. PATENT DOCUMENTS 6,223,254 B1 * 4/2001 Soni ...................... G06F 9/3808
712/213
8,533,726 B2 9/2013 Nishihara et al.
(Continued)

FOREIGN PATENT DOCUMENTS

JP 10-63692 A 3/1998
JP 5644758 B2 12/2014
(Continued)

OTHER PUBLICATIONS

Cmelik et al., "Shade: A Fast Instruction Set Simulator for Execution Profiling", ACM, 1994, pp. 128-137.*
(Continued)

*Primary Examiner* — David J. Huisman
(74) *Attorney, Agent, or Firm* — NSIP Law (57) ABSTRACT

A processor-in-memory (PIM) and a method of outputting an instruction using a PIM. The PIM includes an internal processor, a memory, and a register configured to store instruction meta information. The memory is configured to store a lookup table generated by predicting a future instruction. The external processor is configured to retrieve an instruction corresponding to the instruction meta information from the lookup table in response to a PIM application programming interface (API) call instruction including the instruction meta information. The instruction corresponding to the instruction meta information is output based on a retrieval result.

17 Claims, 7 Drawing Sheets

(58) Field of Classification Search
CPC ............ G06F 9/45508; G06F 9/45516; G06F 9/4552; G06F 15/7821; G06F 15/785
See application file for complete search history.

(56) References Cited

U.S. PATENT DOCUMENTS

| | | | | |
|---|---|---|---|---|
| 11,281,608 | B2* | 3/2022 | Keeth | H01L 23/5384 |
| 2013/0007405 | A1* | 1/2013 | Caskey | G06F 16/9574 |
| | | | | 711/E12.078 |
| 2016/0098200 | A1* | 4/2016 | Guz | G06F 7/00 |
| | | | | 711/154 |
| 2019/0065111 | A1* | 2/2019 | Lea | G06F 9/30036 |
| 2019/0079678 | A1* | 3/2019 | Malladi | G06F 3/0659 |
| 2019/0384512 | A1 | 12/2019 | Penney et al. | |
| 2020/0356305 | A1* | 11/2020 | Kim | G06F 3/0659 |
| 2021/0374002 | A1* | 12/2021 | Chiang | G06F 11/1076 |

FOREIGN PATENT DOCUMENTS

| | | |
|---|---|---|
| KR | 10-2016-0039544 A | 4/2016 |
| KR | 10-1814577 B1 | 1/2018 |
| KR | 10-2019-0030578 A | 3/2019 |

OTHER PUBLICATIONS

Nai et al., "GraphPIM: Enabling Instruction-Level PIM Offloading in Graph Computing Frameworks", 2017 IEEE International Symposium on High Performance Computer Architecture, pp. 457-468.*
Yang et al., "A Processing-in-Memory Architecture Programming Paradigm for Wireless Internet-of-Things Applications", 2019, pp. 1-23.*
Ghose et al., "Processing-in-memory: A workload-driven perspective", IBM, 2019, pp. 3:1 to 3:19.*

* cited by examiner

PROCESSOR-IN-MEMORY STORING A LOOKUP TABLE FOR PROVIDING AN INSTRUCTION IN RESPONSE TO AN API CALL INSTRUCTION

CROSS-REFERENCE TO RELATED APPLICATIONS

This application claims the benefit under 35 USC § 119(a) of Korean Patent Application No. 10-2020-0154790 filed on Nov. 18, 2020, in the Korean Intellectual Property Office, the entire disclosure of which is incorporated herein by reference for all purposes.

BACKGROUND

1. Field

The following description relates to a processor-in-memory (PIM), and more particularly, to technology for outputting an instruction from a PIM.

2. Description of Related Art

In the standard model known as the von Neumann architecture, data are stored in a memory. The memory is separate from a processor, and data move therebetween. In this structure, an inevitable delay occurs due to frequent data movements. Although the memory has been improved with an increase in the speed of the processor, the improvement was not in the transmission rate, but mostly in the capability to store more data in smaller space. When the waiting time required for fetching data from the memory to the processor increases, the speed of the processor may be limited to the transmission rate at a bottleneck. As such, a von Neumann bottleneck that limits throughput due to the waiting time may occur in the standard computer architecture. To solve this bottleneck, a processor-in-memory proposes a structure for performing an operation in a single-chip memory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-in-memory (PIM) includes an internal processor, a memory, and a register configured to store instruction meta information, wherein the memory is configured to store a lookup table generated by predicting a future instruction, an instruction corresponding to the instruction meta information is retrieved, by an external processor, from the lookup table in response to a PIM application programming interface (API) call instruction including the instruction meta information, the instruction corresponding to the instruction meta information is output, by the external processor, based on a retrieval result, and the internal processor is configured to use the output instruction.

The lookup table may be generated by the internal processor or the external processor by predicting the future instruction based on a log of a past instruction.

In a case in which an instruction corresponding to the instruction meta information is retrieved, the retrieved instruction may be output by the external processor.

In a case in which an instruction corresponding to the instruction meta information is not retrieved, an instruction corresponding to the instruction meta information may be generated and output by the external processor.

In a case in which an instruction corresponding to the instruction meta information is not retrieved, an instruction corresponding to the instruction meta information may be stored in the lookup table by the external processor.

In another general aspect, a PIM includes an internal processor, a memory, and a register configured to store instruction meta information, wherein an instruction corresponding to the instruction meta information is generated, by an external processor, in response to a PIM API call instruction including the instruction meta information, the generated instruction is stored in the lookup table by the external processor, the generated instruction is output by the external processor, and the internal processor is configured to use the output instruction.

An instruction corresponding to a next PIM API call instruction may be retrieved, by the external processor, from the lookup table in response to the next PIM API call instruction, and the instruction corresponding to the next PIM API call instruction may be output, by the external processor, based on a retrieval result.

In still another general aspect, a method of outputting an instruction from a PIM including an internal processor, a memory, and a register includes generating a lookup table by predicting a future instruction and storing the lookup table in the memory, storing instruction meta information in the register, retrieving an instruction corresponding to the instruction meta information from the lookup table in response to a PIM application programming interface (API) call instruction including the instruction meta information, outputting the instruction corresponding to the instruction meta information based on a retrieval result, and using, by the internal processor, the output instruction.

The generating of the lookup table may include generating, by the internal processor or the external processor, the lookup table by predicting the future instruction based on a log of a past instruction.

The outputting of the instruction may include outputting, in a case in which an instruction corresponding to the instruction meta information is retrieved, the retrieved instruction.

The outputting of the instruction may include generating, in a case in which an instruction corresponding to the instruction meta information is not retrieved, an instruction corresponding to the instruction meta information and outputting the generated instruction.

The outputting of the instruction may include storing, in a case in which an instruction corresponding to the instruction meta information is not retrieved, an instruction corresponding to the instruction meta information in the lookup table.

In a further general aspect, a method of outputting an instruction from a PIM including an internal processor, a memory, and a register includes storing instruction meta information in the register, generating an instruction corresponding to the instruction meta information in response to a PIM API call instruction including the instruction meta information, storing the generated instruction in the lookup table, outputting the generated instruction, and using, by the internal processor, the output instruction.

The method may further include retrieving an instruction corresponding to a next PIM API call instruction from the lookup table in response to the next PIM API call instruction, and outputting the instruction corresponding to the next PIM API call instruction based on a retrieval result.

Generating the lookup table may be performed by the internal processor or an external processor.

The generating, storing, retrieving, and outputting may be performed by an external processor.

In still another general aspect, a non-transitory computer-readable storage medium may store instructions that, when executed by a processor, cause the processor to perform the method.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions on the examples may be applicable to the following examples and thus, duplicated descriptions will be omitted for conciseness.

Figure 1:
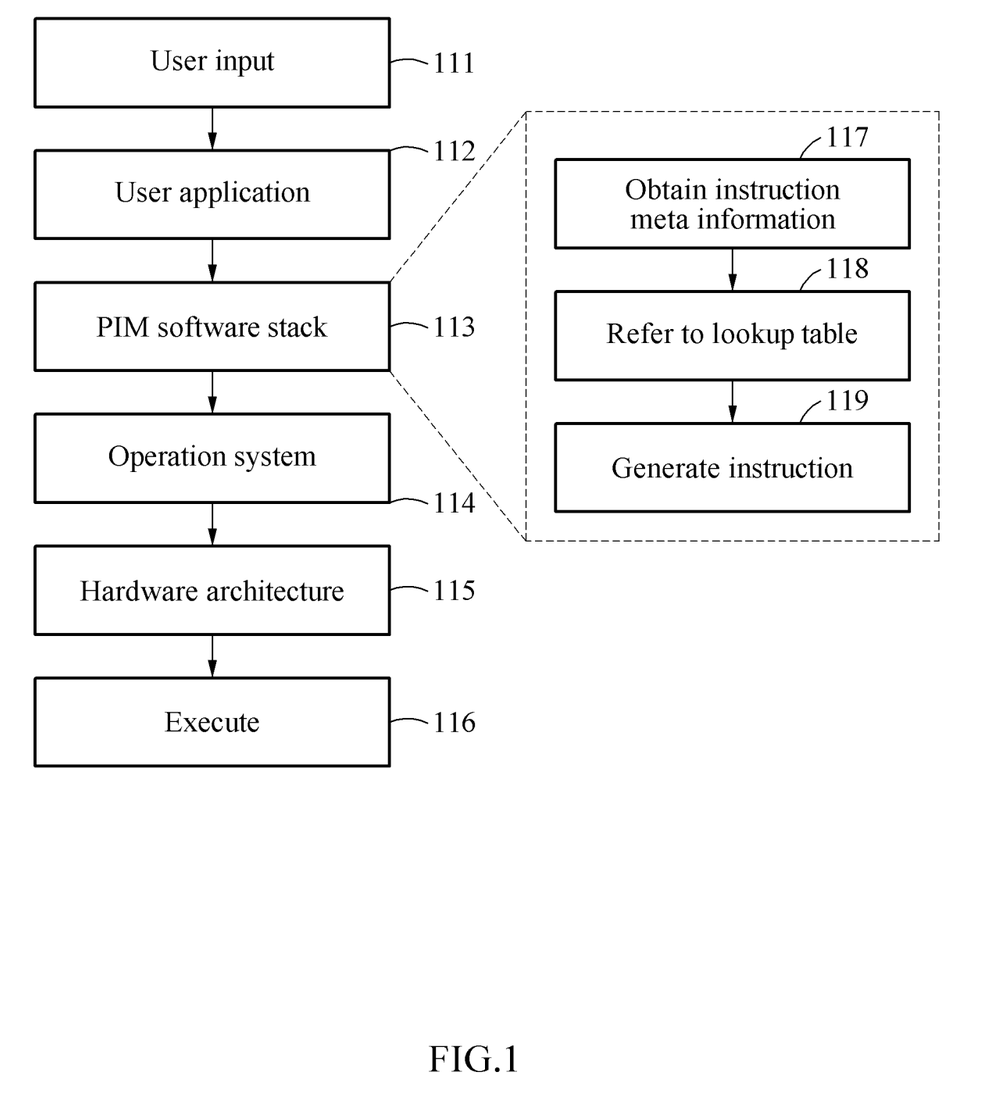
FIG. 1 illustrates an example of accessing a memory by a processor-in-memory (PIM).

FIG. 1 illustrates an example of accessing a memory by a processor-in-memory (PIM).

A PIM refers to a semiconductor in which a processor and a memory are integrated on a single chip. The memory may include a random-access memory (RAM). The PIM may be referred to as processor-in-memory, in-memory processing, in-memory processor, computing-in-memory, in-memory computer, and the like.

Instructions unique to the PIM are needed to perform operations in the PIM. Such instructions may be referred to as PIM instructions, PIM enabled instructions, or memory commands.

The PIM instructions used in the PIM may be accessed through an external host. To access the instructions, the external host may be changed, or an interface between the host and the memory may be changed. However, when existing memory commands are used, an overhead of converting high-level instructions into memory commands occurs. In a system that iteratively performs operations, PIM instructions need to be generated each time an operation is performed. For example, in order to replace a long short-term memory (LSTM) operation of a deep neural network with PIM instructions, a number of same PIM instructions need to be generated, where the number is equal to (the number of layers×the number of steps).

The PIM may generate instructions in advance. The PIM may generate desired instructions in advance based on the size of the operation, the type of the operation, and hardware information, and cache the generated instructions in a lookup table. Thereafter, the PIM may retrieve an instruction from the lookup table in response to an application programming interface (API) call instruction.

Referring to FIG. 1, a user application 112 may receive a user input 111. The user application 112 may call a PIM software stack 113. In operation 119, the PIM software stack 113 may generate an instruction corresponding to the user input 111 to perform a memory operation in the PIM. When the user application 112 calls an operation supported by the PIM, the PIM software stack 113 may generate a corresponding PIM instruction. Thereafter, in operation 116, a desired operation may be executed through an operation system 114 and a hardware architecture 115.

The PIM software stack 113 may perform in-memory operations. The PIM may generate in advance an instruction corresponding to instruction meta information indicating information on an operation based on the instruction meta information and store the generated instruction in the lookup table. The instruction meta information may include the type of the operation, the size of the operation, and the hardware information.

In operation 117, the PIM may obtain the instruction meta information. In operation 118, the PIM may refer to the lookup table in which instructions are stored. In operation 119, the PIM may search the lookup table and output an instruction corresponding to the instruction meta information, or may generate an instruction not in the lookup table. When the same operation is called, the PIM may search the lookup table for an instruction, use the instruction if present, and generate a new instruction if absent. Through this, the overhead of generating an instruction each time an operation is called may be reduced.

If it is possible to obtain statistical information of instructions from the user application 112, a lookup table may be generated in advance before runtime, whereby the overhead incurred in runtime may be reduced. The PIM may statistically analyze log information of the instructions. The PIM may predict a future instruction based on the analysis result and store the predicted instruction in the lookup table in advance. Thereafter, the PIM may retrieve an instruction from the lookup table in response to the API call instruction.

Each time a new instruction is called, the PIM may update the lookup table using the instruction. For example, the PIM may store all new instructions in the lookup table. As another example, the PIM may add or delete new instructions based on the number of calls.

The PIM may be applied to a compiler or algorithm of a system using PIM. The PIM may be used for processing in a neural network. The PIM may be used in various application fields such as natural language processing (NLP), image recognition, speech recognition, and time series prediction using a deep neural network.

Figure 2:
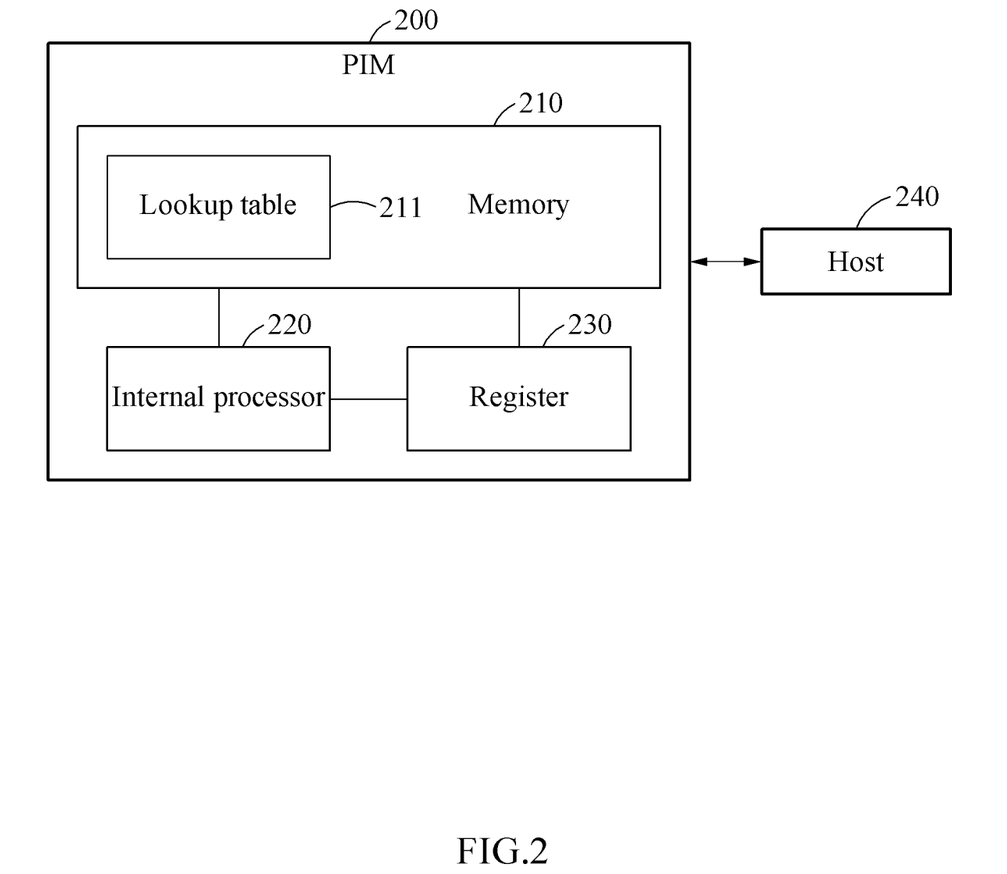
FIG. 2 illustrates an example of an overall configuration of a PIM.

FIG. 2 illustrates an example of an overall configuration of a PIM.

Referring to FIG. 2, a PIM 200 may generate a lookup table by analyzing instructions in advance before the execution of runtime. The PIM 200 may generate desired instructions in advance based on the size of an operation, the type of an operation, and hardware information, and cache the generated instructions in a lookup table. To this end, the PIM 200 includes a memory 210, an internal processor 220, and a register 230. The register 230 may store instruction meta information. The memory 210 may store a lookup table 211 generated by predicting future instructions.

A host 240 (for example, an external processor) may retrieve an instruction from the lookup table in response to a call instruction. The host 240 retrieves an instruction corresponding to the instruction meta information from the lookup table in response to a PIM API call instruction including the instruction meta information. The host 240 outputs an instruction corresponding to the instruction meta information based on the retrieval result. The internal processor 220 may use the output instruction.

The lookup table 211 may be generated by the internal processor 220 or the host 240 by predicting the future instructions based on logs of past instructions. The logs of the past instructions are statistically analyzed, and the lookup table 211 may be generated based on the analysis result in the order of high call frequencies of the instructions. The lookup table 211 may include an instruction that is predetermined based on a specification set in a user application.

When an instruction corresponding to the instruction meta information is retrieved from the lookup table 211, the host 240 may output the retrieved instruction. The internal processor 220 may use the output instruction. Since only the operation of searching and accessing the lookup table 211 is performed, the process of calculating an access address of the corresponding instruction based on the meta information of the instruction may be omitted, and the overhead of performing calculation each time may be reduced.

When an instruction corresponding to the instruction meta information is not retrieved from the lookup table 211, the host 240 may generate an instruction corresponding to the instruction meta information and output the generated instruction. The internal processor 220 may use the output instruction.

When an instruction corresponding to the instruction meta information is not retrieved, the host 240 may generate an instruction corresponding to the instruction meta information and store the generated instruction in the lookup table 211. The host 240 may generate an instruction that is not retrieved, and update the lookup table 211 using the generated instruction. Thereafter, when the same instruction is called, the overhead may be reduced by searching the lookup table 211.

In another example, the PIM 200 may store instructions generated during the runtime execution in the lookup table 211, rather than preparing the lookup table 211 in advance. To this end, the PIM 200 includes a memory 210, an internal processor 220, and a register 230. The register 230 may store instruction meta information.

A host 240 (for example, an external processor) generates an instruction corresponding to instruction meta information in response to a PIM API call instruction including the instruction meta information. The host 240 generates a lookup table 211 to store the generated instruction. The host 240 outputs the generated instruction.

The host 240 stores the generated instruction in the lookup table 211. The host 240 may retrieve an instruction corresponding to a next PIM API call instruction from the lookup table 211 in response to the next PIM API call instruction. The host 240 may output the instruction corresponding to the next PIM API call instruction based on a retrieval result. When the same instruction is called, the overhead may be reduced by searching the lookup table 211. The internal processor 220 may use the output instruction.

Figure 3:
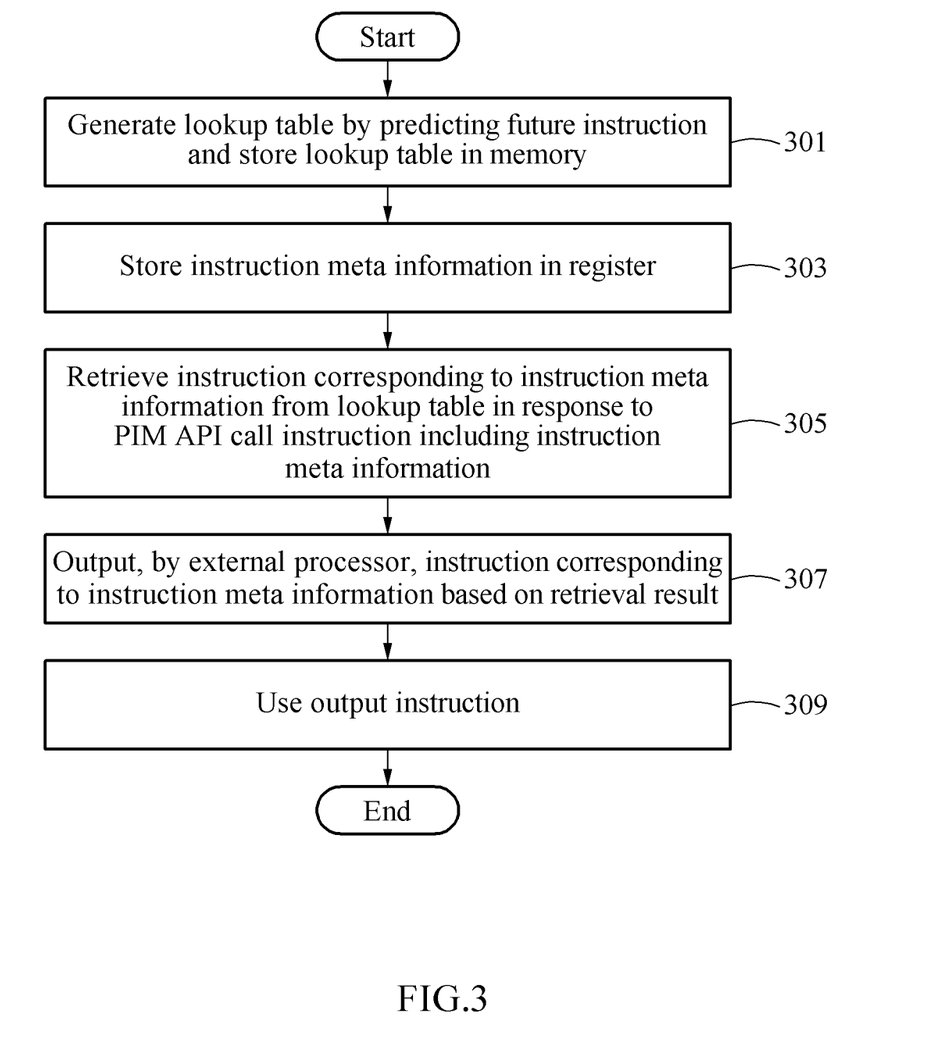
FIG. 3 illustrates an example of an overall operation of an instruction output method.

FIG. 3 illustrates an example of an overall operation of an instruction output method.

Referring to FIG. 3, in operation 301, an external processor generates a lookup table by predicting a future instruction, and stores the lookup table in a memory. An internal processor or the external processor may generate the lookup table by predicting the future instruction based on a log of a past instruction. The lookup table may store an instruction that is predetermined based on a specification set in a user application.

In operation 303, instruction meta information is stored in a register. The instruction meta information may include the type of an operation, the size of an operation, and hardware information. The instruction meta information may be received from the outside or stored in the register in advance.

In operation 305, the external processor retrieves an instruction corresponding to the instruction meta information from the lookup table in response to a PIM API call instruction including the instruction meta information.

In operation 307, the external processor outputs the instruction corresponding to the instruction meta information based on a retrieval result. When an instruction corresponding to the instruction meta information is retrieved, the external processor may output the retrieved instruction. When an instruction corresponding to the instruction meta information is not retrieved, the external processor may generate an instruction corresponding to the instruction meta information and output the generated instruction. The internal processor may use the output instruction in operation 309.

When an instruction corresponding to the instruction meta information is not retrieved, the external processor may store an instruction corresponding to the instruction meta information in the lookup table. Thereafter, each time the same operation is called, the overhead of generating an instruction may be reduced.

Figure 4:
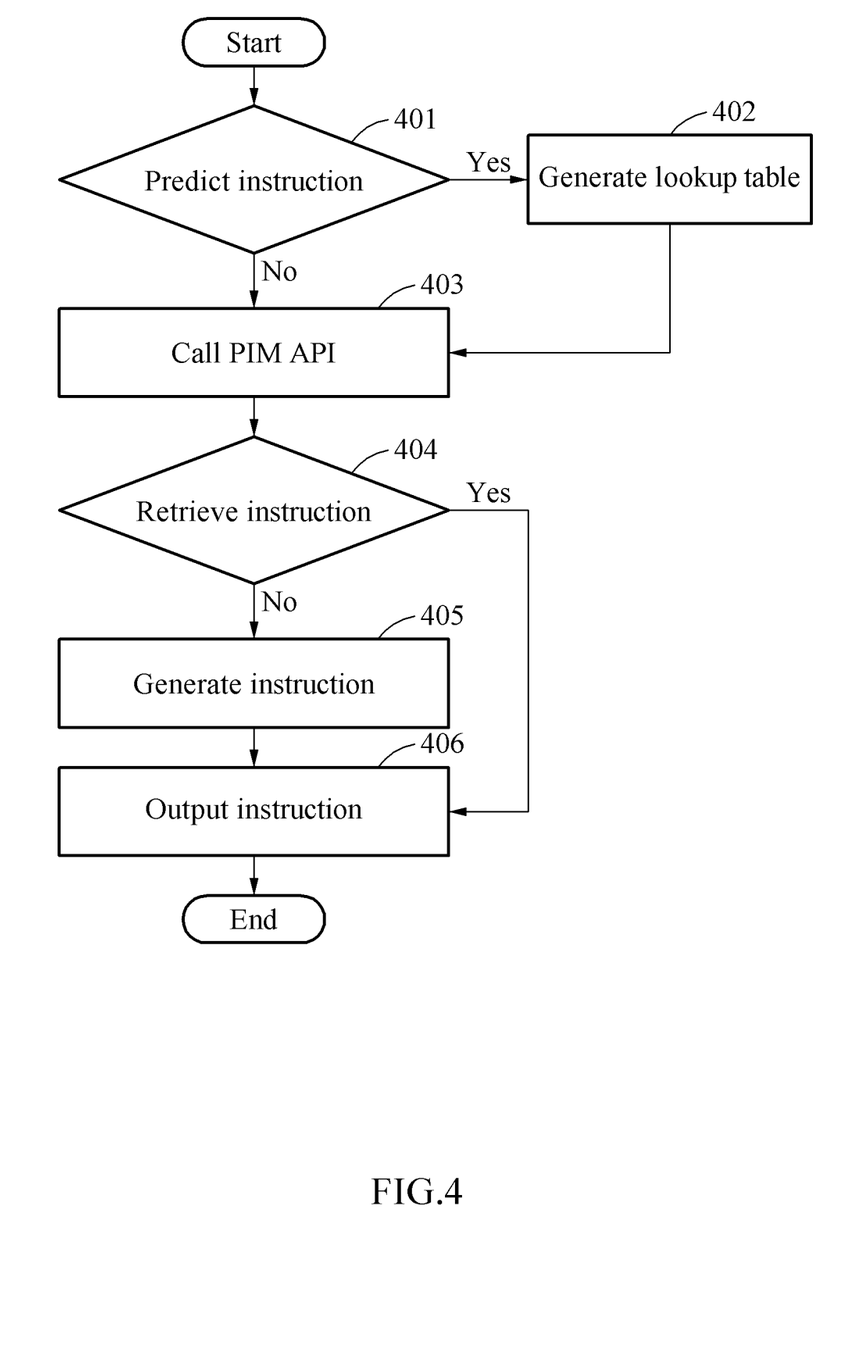
FIG. 4 illustrates an example of an instruction output method.

FIG. 4 illustrates an example of an instruction output method.

In operation 401, a PIM may predict an instruction to be used in the future. The future instruction may be predicted by an internal processor or an external processor based on a log of a past instruction.

In operation 402, the PIM may generate a lookup table based on a prediction result. The PIM may generate desired instructions in advance based on the size of an operation, the type of an operation, and hardware information, and cache the generated instructions in the lookup table.

In operation 403, a user application may call a PIM API. When the user application calls an operation supported by the PIM, the PIM outputs a corresponding instruction. To this end, the PIM first searches the lookup table and calculates access information of the instruction based on instruction meta information only when necessary.

In operation 404, the PIM may retrieve the instruction from the lookup table. The PIM may retrieve the instruction corresponding to the instruction meta information and output a memory address at which the instruction is stored. Whether to perform operation 405 may depend on a retrieval result.

If an instruction is not retrieved, the PIM may generate an instruction, in operation 405. The PIM may calculate a memory address at which the instruction is stored based on the instruction meta information.

In operation 406, the PIM may output the instruction. When an instruction is retrieved from the lookup table, the PIM may output the retrieved instruction. When an instruction is not retrieved from the lookup table, the PIM may output an instruction through instruction access information that is calculated by itself from the instruction meta information.

Figure 5:
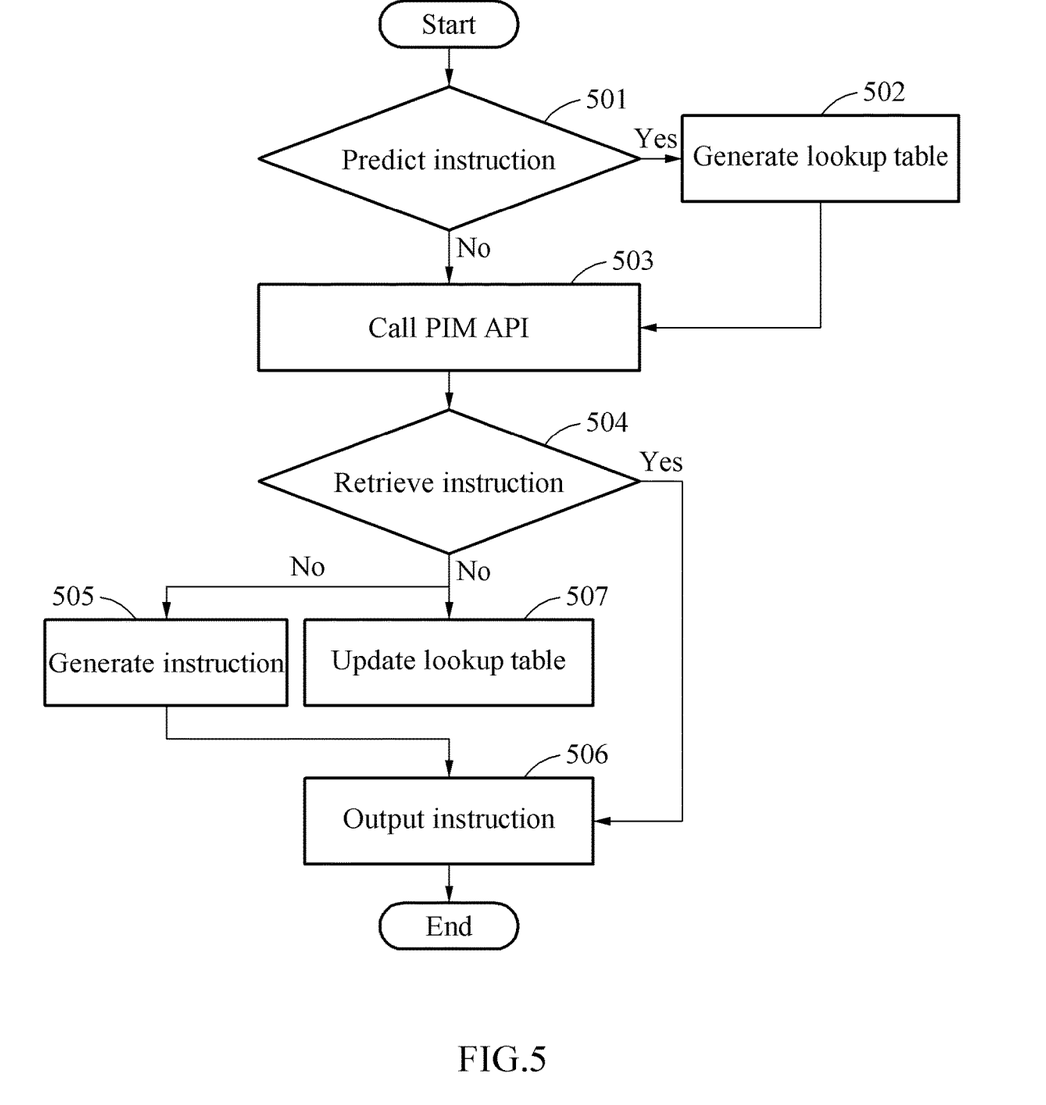
FIG. 5 illustrates an example of an instruction output method.

FIG. 5 illustrates an example of an instruction output method.

In operation 501, a PIM may predict an instruction to be used in the future. The future instruction may be predicted by an internal processor or an external processor based on a log of a past instruction.

In operation 502, the PIM may generate a lookup table based on a prediction result. The PIM may generate desired instructions in advance based on the size of an operation, the type of an operation, and hardware information, and cache the generated instructions in the lookup table.

In operation 503, a user application may call a PIM API. When the user application calls an operation supported by the PIM, the PIM outputs a corresponding instruction. To this end, the PIM first searches the lookup table and calculates access information of the instruction based on instruction meta information only when necessary.

In operation 504, the PIM may retrieve the instruction from the lookup table. The PIM may retrieve the instruction corresponding to the instruction meta information and output a memory address at which the instruction is stored. Whether to perform operation 505 may depend on a retrieval result.

If an instruction is not retrieved, the PIM may generate an instruction, in operation 505. The PIM may calculate a memory address at which the instruction is stored based on the instruction meta information.

In operation 506, the PIM may output the instruction. When an instruction is retrieved from the lookup table, the PIM may output the retrieved instruction. When an instruction is not retrieved from the lookup table, the PIM may output an instruction through instruction access information that is calculated by itself from the instruction meta information.

In operation 507, the PIM may update the lookup table based on the newly generated instruction. Thereafter, when the same instruction is called, the overhead may be reduced by searching the lookup table.

Figure 6:
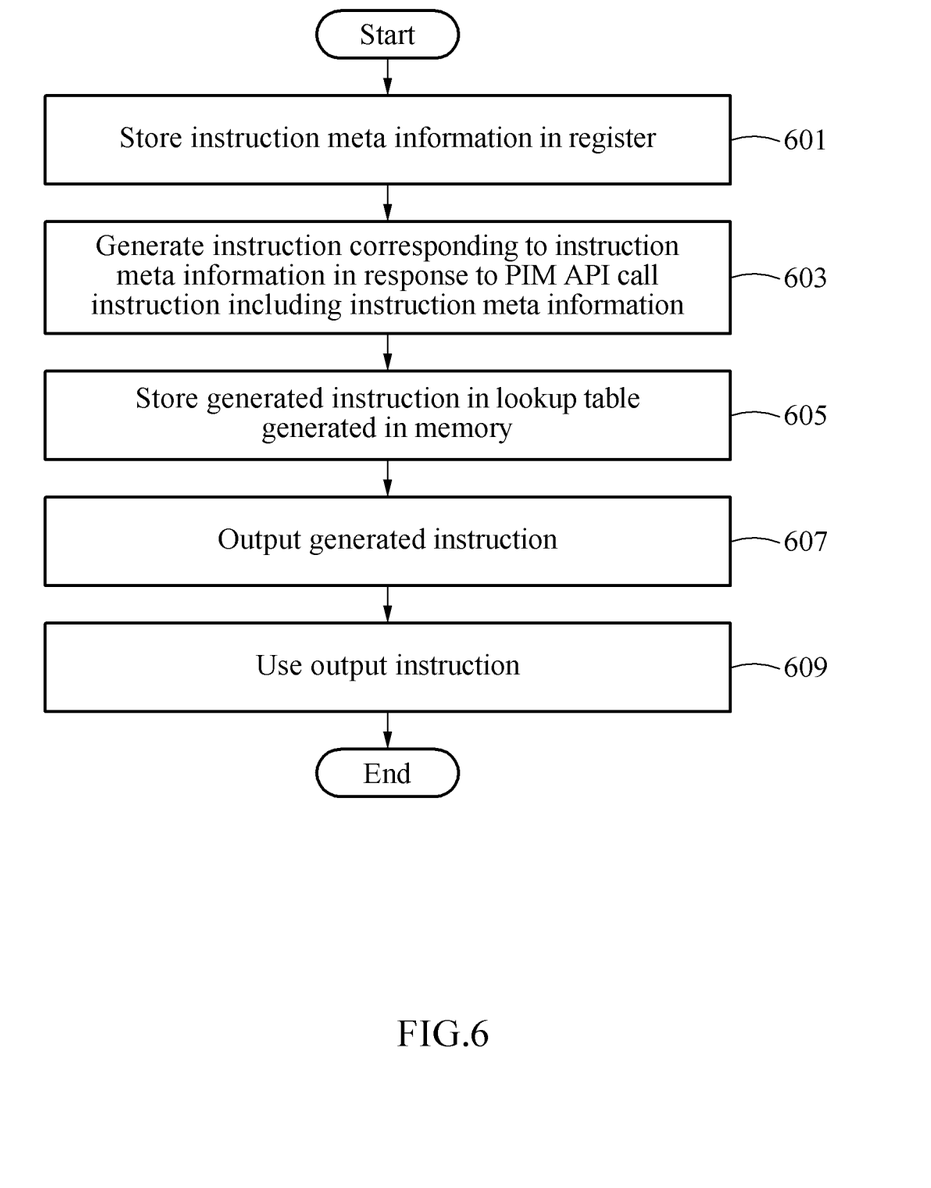
FIG. 6 illustrates an example of an overall operation of an instruction output method.

FIG. 6 illustrates an example of an overall operation of an instruction output method.

A PIM may store instructions generated during the runtime execution in a lookup table, rather than preparing the lookup table in advance.

In operation 601, the PIM may store instruction meta information in a register. The instruction meta information may include the type of an operation, the size of an operation, and hardware information. The instruction meta information may be received from the outside or stored in the register in advance.

In operation 603, the PIM may generate an instruction corresponding to the instruction meta information in response to a PIM API call instruction including the instruction meta information. The PIM may calculate access information of the instruction based on the instruction meta information.

In operation 605, the PIM may store the generated instruction in a lookup table generated in the memory. The PIM may update the lookup table based on the newly generated instruction.

In operation 607, the PIM may output the generated instruction.

In operation 609, the PIM may use the generated instruction.

Thereafter, when the same instruction is called, the PIM may search the lookup table, thereby reducing the overhead. The PIM may retrieve an instruction corresponding to a next PIM API call instruction from the lookup table in response to the next PIM API call instruction. The PIM may output the instruction corresponding to the next PIM API call instruction based on a retrieval result.

Figure 7:
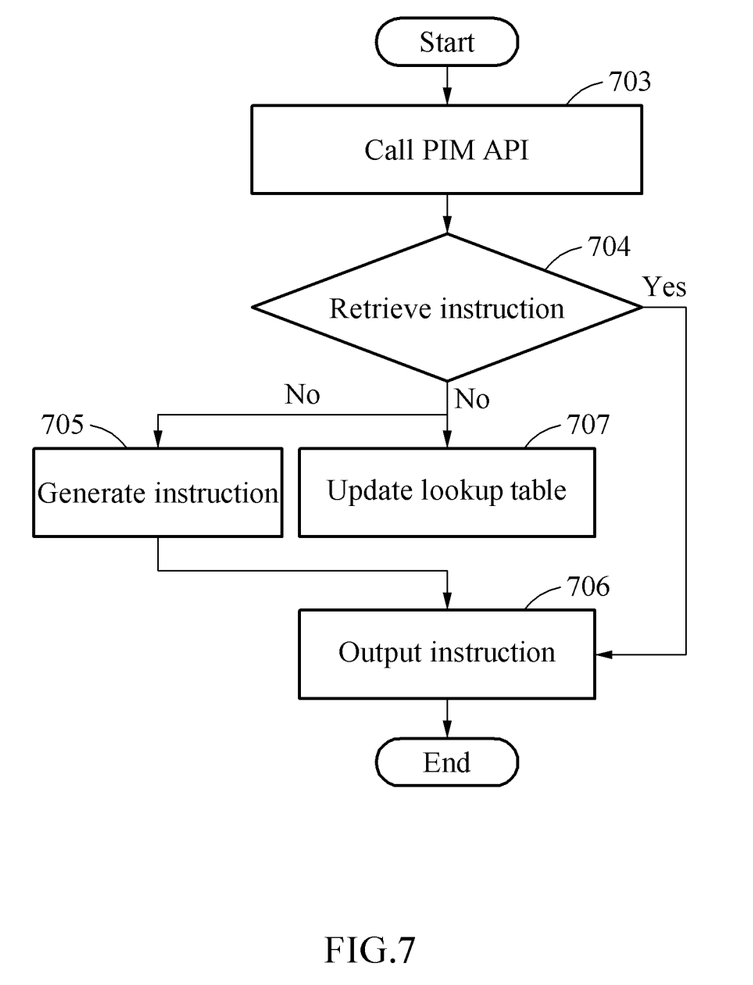
FIG. 7 illustrates an example of an instruction output method.

FIG. 7 illustrates an example of an instruction output method.

In operation 703, a user application may call a PIM API. When the user application calls an operation supported by the PIM, the PIM outputs a corresponding instruction. To this end, the PIM first searches the lookup table and calculates access information of the instruction based on instruction meta information only when necessary.

In operation 704, the PIM may retrieve the instruction from the lookup table. The PIM may retrieve the instruction corresponding to the instruction meta information and output a memory address at which the instruction is stored. Whether to perform operation 705 may depend on a retrieval result.

If an instruction is not retrieved, the PIM may generate an instruction, in operation 705. The PIM may calculate a memory address at which the instruction is stored based on the instruction meta information.

In operation 707, the PIM may update the lookup table based on the newly generated instruction. The PIM may store the generated instruction in the lookup table.

In operation 706, the PIM may output the instruction. When an instruction is retrieved from the lookup table, the PIM may output the retrieved instruction. When an instruction is not retrieved from the lookup table, the PIM may output an instruction through instruction access information that is calculated by itself from the instruction meta information.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A processor-in-memory (PIM), comprising:
an internal processor;
a memory; and
a register configured to store instruction meta information,
wherein the PIM is configured to provide a first instruction corresponding to the instruction meta information to an external processor, from a lookup table in the memory, in response to a received PIM application programming interface (API) call instruction including the instruction meta information,
wherein information in the lookup table is based on a prediction, of a future instruction, based on statistical information of plural instructions of a user application, and
wherein the PIM is configured to receive the first instruction from the external processor, and the internal processor is configured to perform an operation based on the received first instruction.

2. The PIM of claim 1, wherein the internal processor or the external processor is configured to generate the information in the lookup table by the prediction of the future instruction based on a log of a past instruction previously implemented by the PIM.

3. The PIM of claim 1, wherein, in response to a performed search of the lookup table resulting in the first instruction not being found in the lookup table, the external processor generates the first instruction and provides the generated first instruction to the internal processor, and
wherein the performing of the operation includes performing the operation using the provided generated first instruction.

4. The PIM of claim 1, wherein, in response to a performed search of the lookup table resulting in the first instruction not being found in the lookup table, the external processor generates and stores the generated first instruction in the lookup table, and
wherein the performing of the operation includes performing of the operation using the generated first instruction.

5. The PIM of claim 1, wherein the statistical information includes a call frequency of a past instruction.

6. The PIM of claim 1, wherein the lookup table has a size dependent on at least one of a size of the operation, a type of the operation, and hardware information.

7. A processor-in-memory (PIM), comprising:
an internal processor;
a memory; and
a register configured to store instruction meta information,
wherein the PIM is configured to provide a first instruction, stored in a lookup table by an external processor and corresponding to the instruction meta information, to the external processor, in response to a PIM application programming interface (API) call instruction including the instruction meta information being received from the external processor,
wherein the PIM is configured to receive the provided first instruction from the external processor, and the internal processor is configured to perform an operation based on the received provided first instruction.

8. The PIM of claim 7,
wherein a next instruction, corresponding to a received next PIM API call instruction, is provided from the lookup table to the external processor, and
wherein the next instruction is received by the internal processor from the external processor.

9. A method using a processor-in-memory (PIM) that includes an internal processor, a memory, and a register, the method comprising:
- generating a lookup table based on a result of a predicting of a future instruction, and storing the lookup table in the memory, where the predicting of the future instruction is based on statistical information of plural instructions of a user application;
- storing instruction meta information in the register;
- receiving a PIM application programming interface (API) call instruction including the instruction meta information;
- retrieving a first instruction corresponding to the instruction meta information from the lookup table; and
- performing an operation corresponding to the instruction meta information, comprising:
  - at a first time, in response to the first instruction being retrieved from the lookup table, outputting the retrieved first instruction from the PIM and performing, by the internal processor, the operation using the retrieved output first instruction, and
  - at a second time, in response to the first instruction not being retrieved from the lookup table, performing the operation using a new instruction subsequently generated by the internal processor or an external processor, or using the new instruction as subsequently generated by the internal processor or the external processor and stored in the lookup table.

10. The method of claim 9, wherein the generating of the lookup table comprises generating the lookup table by performing the predicting of the future instruction based on a log of a past instruction previously implemented by the PIM.

11. The method of claim 10, wherein the generating of the lookup table is performed by the internal processor.

12. The method of claim 10, wherein the generating of the lookup table is performed by the external processor.

13. The method of claim 9, further comprising, at the second time:
- generating the new instruction corresponding to the instruction meta information.

14. The method of claim 9, comprising, at the second time:
- generating and storing the new instruction in the lookup table.

15. The method of claim 9, wherein the statistical information includes a call frequency of a past instruction.

16. The method of claim 9, further comprising performing the generating of the lookup table based on at least one of a size of the operation, a type of the operation, and hardware information.

17. A non-transitory computer-readable storage medium storing instructions that, when executed by a processor-in-memory (PIM) that includes an internal processor, a memory, and a register, cause the PIM to:
- generate a lookup table based on a result of a predicting of a future instruction, and storing the lookup table in the memory, where the predicting of the future instruction is performed by the internal processor based on statistical information of plural instructions of a user application;
- store instruction meta information in the register;
- retrieve a first instruction corresponding to the instruction meta information from the lookup table in response to receipt of a PIM application programming interface (API) call instruction including the instruction meta information;
- output, from the PIM, the retrieved first instruction;
- receive the output first instruction; and
- perform, by the internal processor, an operation using the received output first instruction.

* * * * *